United States Patent [19]

Waldecker et al.

[11] Patent Number: 4,669,056
[45] Date of Patent: May 26, 1987

[54] DATA PROCESSING SYSTEM WITH A PLURALITY OF PROCESSORS ACCESSING A COMMON BUS TO INTERLEAVED STORAGE

[75] Inventors: Donald E. Waldecker; Charles G. Wright, both of Round Rock, Tex.

[73] Assignee: International Business Machines Corporation, Armonk, N.Y.

[21] Appl. No.: 636,188

[22] Filed: Jul. 31, 1984

[51] Int. Cl.⁴ ............................................. G06F 9/00
[52] U.S. Cl. .................................................. 364/900
[58] Field of Search ............................. 364/200, 900

[56] References Cited

U.S. PATENT DOCUMENTS

| | | | |
|---|---|---|---|
| 3,447,135 | 5/1969 | Calta et al. | 364/200 |
| 3,997,896 | 12/1976 | Cassarino, Jr. et al. | 364/200 |
| 4,128,882 | 12/1978 | Dennis | 364/200 |
| 4,130,885 | 12/1978 | Dennis | 364/900 |
| 4,232,366 | 11/1980 | Levy et al. | 364/200 |
| 4,280,176 | 7/1981 | Tan | 364/200 |
| 4,484,275 | 11/1984 | Katzman et al. | 364/200 |
| 4,494,192 | 1/1985 | Lew et al. | 364/200 |
| 4,564,899 | 1/1986 | Holly et al. | 364/200 |

OTHER PUBLICATIONS

"Synchronous LSSD Packet Switching Memory and I/O Channel", T. L. Jeremiah et al., *IBM Technical Disclosure Bulletin,* vol. 24, No. 10, Mar. 1982, p. 4986.
"The Design of a Computer, The Control Data 6600", J. E. Thornton, Scott, Foresman and Company, Glenview, Ill., published in 1970, pp. 44–56.

*Primary Examiner*—Gareth D. Shaw
*Assistant Examiner*—John G. Mills
*Attorney, Agent, or Firm*—J. B. Kraft; Thomas E. Tyson

[57] ABSTRACT

A plurality of data processor units are connected to a common bus which is connected to first and second interleaved storage units. The system is a synchronous one in which timing means establish a series of information transfer intervals. One or more of the processor units contain apparatus for selectively commencing an address transfer on the bus to one of the storage units during a transfer interval; the storage transaction initiated by the address transfer will require more than the one transfer interval to complete. One or more of the processors have means for monitoring the bus in order to determine whether an address on the bus has been transferred to the first or the second storage unit during a particular transfer interval. The address transfer apparatus further includes apparatus responsive to the monitoring apparatus for selectively transferring the next subsequent address to the other of said storage units to thus achieve alternating interleaving between storage units.

4 Claims, 4 Drawing Figures

DATA PROCESSING SYSTEM WITH A PLURALITY OF PROCESSORS ACCESSING A COMMON BUS TO INTERLEAVED STORAGE

TECHNICAL FIELD

The present invention relates to data processing systems and particularly to systems having a common system bus connecting a central processing unit and one or more other processing units such as peripheral equipment control processor to the main bus which bus is in turn connected to interleaved storage units.

BACKGROUND ART

In the data processing art including present day microprocessor technology, it is a known expedient to use pipelining on the primary I/O bus or channel which connect the main storage unit of the system to the CPU and various peripheral processors which are in turn connected to various I/O devices such as disk, display or printers. Such pipelining involves overlapped transactions on the I/O bus, i.e., a plurality of data transfers to and from various I/O devices or units or main storage may be overlapped on the primary I/O bus. In other words, the I/O bus needn't be locked into a single transaction; a first transaction may be initiated and before it is completed a second and a third transfer transaction involving the I/O bus may be initiated. Some typical patents describing such pipelining are Calta et al, U.S. Pat. No. 3,447,135, Peripheral Data Exchange; Dennis, U.S. Pat. No. 4,130,885, Packet Memory System for Processing Many Independent Memory Transactions Concurrently; Levy et al, U.S. Pat. No. 4,232,366, Bus for a Data Processing System with Overlapped Sequences; Dennis, U.S. Pat. No. 4,128,882, Packet Memory System with Hierarchical Structure; Cassarino, Jr. et al, U.S. Pat. No. 3,997,896, Data Processing System Providing Split Bus Cycle Operation; and the article "Synchronous LSSD Packet Switching Memory and I/O Channel", T. L. Jeremiah et al, published in the *IBM Technical Disclosure Bulletin*, Vol. 24, No. 10, March 1982.

To further maximize performance of the data processing systems, such common buses have been used to connect central processing units and various peripheral processing units to storage means having a plurality of interleaved storage units or banks. Such a system has been described as early as 1970 in the text "The Design of A Computer, The Control Data 6600", J. E. Thornton, Scott, Foresman and Company, Glenview, Ill., Published in 1970, particularly pages 44-56.

The interleaved storage means complements the pipelined common bus. Because storage operations are generally slower than the processors addressing the memory, the pipelined common bus gave processors the capability of sending addresses and other commands to memory or storage at a rate greater than basic storage units could handle. This resulted in the development of interleaved storage units wherein the address sent to storage from processors over the common bus addressed a plurality of interleaved memory units in sequence. As a result of this interleaving, each storage unit experiences a delay between addresses to it based upon the number of intermediate sequential interleaved storage units. As a result, the storage system can handle the addresses at a rate equivalent to the rate in which processors can provide such addresses.

While such interleaved storage systems have produced high performance data processing, we have noted in systems involving a common bus to which a plurality of processors may have access based upon conventional priority determining arrangements, there is some loss in efficiency in sequentially addressing the interleaved storage units every time access to the common bus is switched from one processor to another. While each processor may have its individual capability of addressing the interleaved storage units in the best sequence when there is a switch in access to the common bus, there tends to be a break in the sequence of addressing the interleaved storage units because of the transition of the sequence of addresses provided by processor originally having access and the processor to which access is switched. The reduced efficiency becomes particularly marked when there is a high frequency of switching access to the common bus from one processor to the other. In cases where switching is relatively frequent, there may be a reduction of up to 50% from the maximum address rate which the interleaved storage system is capable of.

The present invention provides a data processing system wherein efficiency in sequentially accessing interleaved storage units from a common bus is maximized even in systems having a high frequency of switching access to the bus between a plurality of processors.

DISCLOSURE OF THE INVENTION

In a data processing system of the type described above having a common bus, a plurality of storage units connected to the bus, a plurality of processor units connected to the bus wherein each of the processor units includes means to address a plurality of storage units in a sequence to provide interleaved storage, and priority means for switching access to the common bus from one of the processors to another, the present invention provides an improvement wherein at least one of the processors includes means for monitoring the common bus to determine the last storage unit addressed prior to switching, and means responsive to these monitoring means for addressing the next storage unit in sequence. This continues the sequence of addressing the interleaved storage units substantially without any interruption.

More specifically, the present invention provides a data processing system comprising a first and a second storage unit, a common bus connected to the first and second storage units, a plurality of processor units connected to the common bus, and timing means for establishing a series of information transfer intervals.

One or more of the processor units have means for selectively commencing an address transfer to one of the storage units during a transfer interval; the storage transaction initiated by the address transfer requires more than one interval to complete. The processor unit further includes means for monitoring the bus in order to determine whether an address on the bus has been transferred to the first or the second storage unit during the transfer interval. Also, the address transfer means further includes means responsive to the monitoring means for selectively transferring the next subsequent address to the other of the storage units.

The system is particularly effective in a system having a central processing unit with means for commencing a sequence of alternating consecutive address transfers to the first and to the second storage unit in combination with another processor unit containing the means for monitoring the bus in order to determine whether the address on the bus has been transferred to the first or the second storage unit. Accordingly, when the priority means switch access to the common bus from the central processing unit, the other processor can provide an address transfer or sequence of address transfers to the interleaved storage units which will be substantially in synchronization with the previous transfers from the central processing unit to the storage units.

BRIEF DESCRIPTION OF THE DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
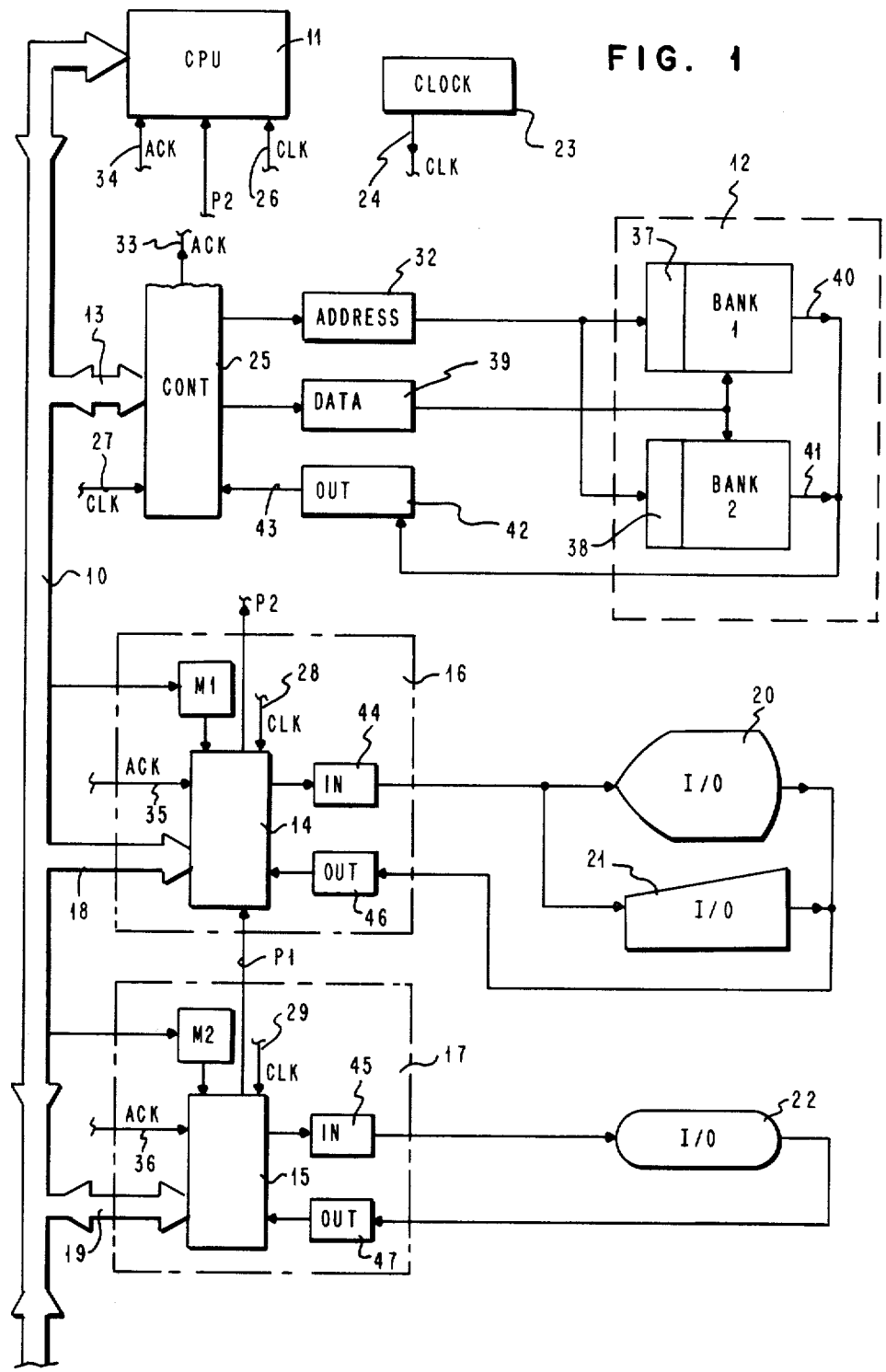
FIG. 1 is a logical block diagram showing the apparatus associated with the present invention in generalized film.

With reference to FIG. 1, generalized diagram of the apparatus which may be used in carrying out the present invention is shown. Common bus 10 is accessed by the central processing unit 11, memory 12 which is connected to bus 10 via branch 13 as will be hereinafter described in greater detail. In addition, processors 16 and 17 are connected with bus 10 through branches 18 and 19 respectively connected with controllers 14 and 15 in processors 16 and 17. Processors 16 and 17 respectively connect with and control peripheral equipment such as display 20, keyboard 21 or I/O terminal 22 and act to control these I/O devices. Processors 16 and 17 may be any conventional I/O equipment controllers. Processors 16 and 17 may transmit data to and from the CPU via bus 10. However, the present invention is primarily concerned with the transmission of information between CPU 11, and interleaved memory 12 as well as between processors 16 and 17 and memory 12. CPU 11 may be any conventional processor using pipelining operations.

The system is one having synchronized overlapped transactions on the common bus 10 under the control of clock 23 which produces clock pulses (CLK) on line 24 which are respectively applied to the CPU 11, storage controller 25, and processor controllers 14 and 15, respectively, via lines 26, 27, 28 and 29. The pipelining is carried out in a conventional manner, e.g., in the manner described in U.S. Pat. No. 3,447,135, Calta et al. With such pipelining, transactions from the CPU or from peripheral devices via processors 16 and 17 to and from main memory 12 may be overlapped on common bus 10. In other words, common bus 10 need not be locked into a single transaction; when a transaction, from either the CPU 11 or processors 16 and 17 is initiated with respect to memory 12 over bus 10, the bus is not locked in until the transaction is completed, e.g., read data is returned from memory. In any event, the present invention is primarily concerned with how memory 12 which consists of a pair of interleaved storage banks 1 and 2 is sequentially addressed so as to maximize efficiency of addressing from CPU 11 and processors 16 and 17 to interleaved storage banks 1 and 2 via common bus 10.

Before we go into the details of how the addressing of interleaved memory in accordance with the present invention is carried out, we will give a general description of the remaining apparatus. Any transaction involving information from either the CPU or processors 16 and 17 with main memory 12 is connected from the respective processor to memory via common bus 10 and branch 13 under the control of storage controller 25. If the particular processor is granted access to common bus 10 by the priority arrangement to be subsequently described then, if the data is an address, it proceeds through controller 25 to address buffer 32. If buffer 32 is not busy and can handle the address, an acknowledgement (ACK) is sent on line 33 from storage controller 25 and is respectively applied to CPU 11, controllers 14 and 15 via lines 34, 35 and 36. Then, as will be hereinafter described in greater detail, the address from buffer 32 is applied either to storage buffer 37 of storage bank 1 or storage buffer 38 of storage bank 2 in alternating sequence.

How this alternating sequence of addressing is achieved, particularly when access to bus 10 is switched between CPU 11 and processors 16 and 17 will be subsequently described in greater detail. However, it should be noted that CPU 11 as well as processors 16 and 17 provide addresses to bus 10 during transfer intervals defined by clock 23 at a rate such that input of addresses to address buffer 32 is faster than the time required for completion of the transfer to either storage buffer 37 or storage buffer 38. Consequently, the need for two interleaved storage banks 1 and 2, i.e., while a first transfer to storage buffer 37 of storage bank 1 is being completed, a subsequent transfer from address register 32 to storage buffer 38 of storage bank 2 may be commenced and so on alternatively transferring addresses to storage buffers 37 and 38.

It should be noted that the time required to complete an address transfer, i.e., a transfer from a processor through address buffer 32 to either storage bank 1 or storage bank 2 represents only a portion of a storage read or write transaction. For example, if data is to be written into storage, it is transferred at some interval subsequent to the address interval from the source processor (11, 16 or 17) via bus 10, branch 13, controller 15 and data buffer 39. On the other hand, if data is to be read out of the address storage bank 1 or 2, then at some subsequent cycle, it is read out via lines 40 and 41 and applied to output buffer 42 from which it is transferred to the respective requesting processor 11, 16 or 17 via line 43, controller 25, branch 13 and bus 10. The data to and from processors 16 and 17 relative to memory 12 is to be used by the I/O devices 20, 21 and 22. Data read from storage for these devices is respectively stored in input buffers 44 and 45 while data to be written into storage from these devices is respectively stored in output buffers 46 and 47 in processors 16 and 17.

In any event, the key aspect of the present invention is how storage banks 1 and 2 are alternately addressed in sequence with addresses from the common bus 10 irrespective of the processor 11, 16 or 17 from which the address is transmitted on to bus 10. As we have set forth hereinabove in the discussion of the prior art, each of the processors has internal capability of transmitting a sequence of addresses onto bus 10 which alternately address bank 1 and then bank 2. The embodiment of the present invention relates to how this sequence is maintained when access to common bus 10 is switched from one of the processors 11, 16 or 17 to another.

Figure 2:
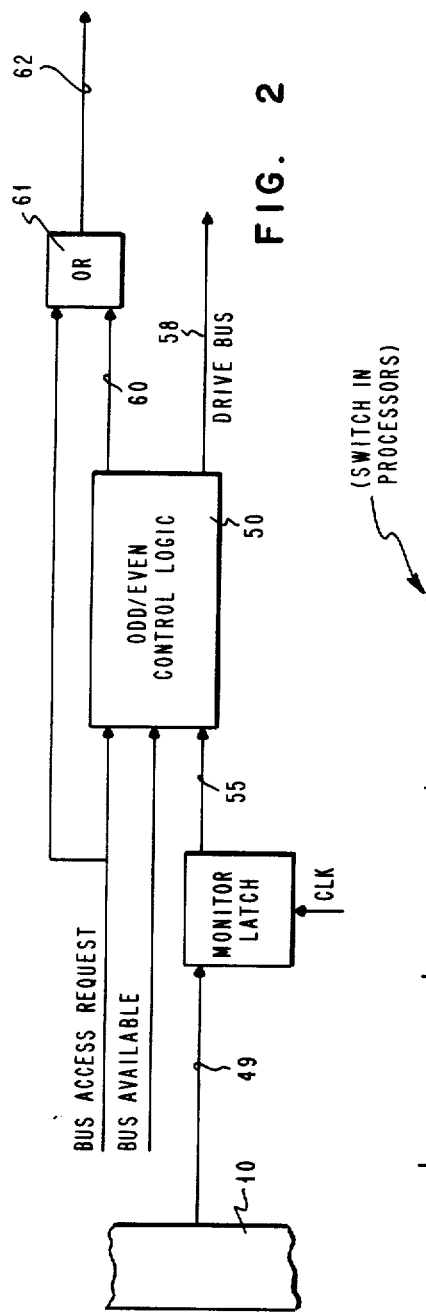
FIG. 2 is a more specific diagram showing the bus monitoring circuitry and logic utilized in the processors.

Now, with respect to FIGS. 2 and 3 there will be described an operation in accordance with the present invention involving the monitoring of the bus 10 in order to control subsequent address transfers in the established alternating sequence. Monitor latches M1 and M2 (FIG. 1) monitor common bus 10 in order to determine whether the last address transfer on the bus has been to storage bank 1 or storage bank 2. Further details are shown in FIG. 2. The monitor latch senses the common bus 10 through connector 49. A convenient arrangement is to have one bit in the address command sent on bus 10 representative of the storage bank. Thus, if the bit is up, the address has to be transferred to storage bank 1 and if the bit is down, the address is to be transferred to storage bank 2. Conveniently this can be the low order bit in the address. In order to monitor and preserve the storage bank determining bit from the last address transfer, M1 is a conventional monitor latch which responds to the clock signal to latch the bit and thus save it until the clock signal in the next cycle. The saved bit is thus available and is provided to the odd-/even control logic circuitry 50 which is a series of standard logic gates operating in accordance with the flow chart of FIG. 3 to control the operations described in FIG. 3. Let us now consider an operation as shown in the timing graph of FIG. 4 wherein CPU 11 (FIG. 1) has control of bus 10 and makes the first alternating sequential transfer of four addresses to storage banks 1 and 2 during the time sequence t0-t3. Then, access to the bus is switched to processor 17 which has control of the bus and makes the next three address transfers t4-t6 to storage banks 1 and 2 in alternating sequence.

Figure 3:
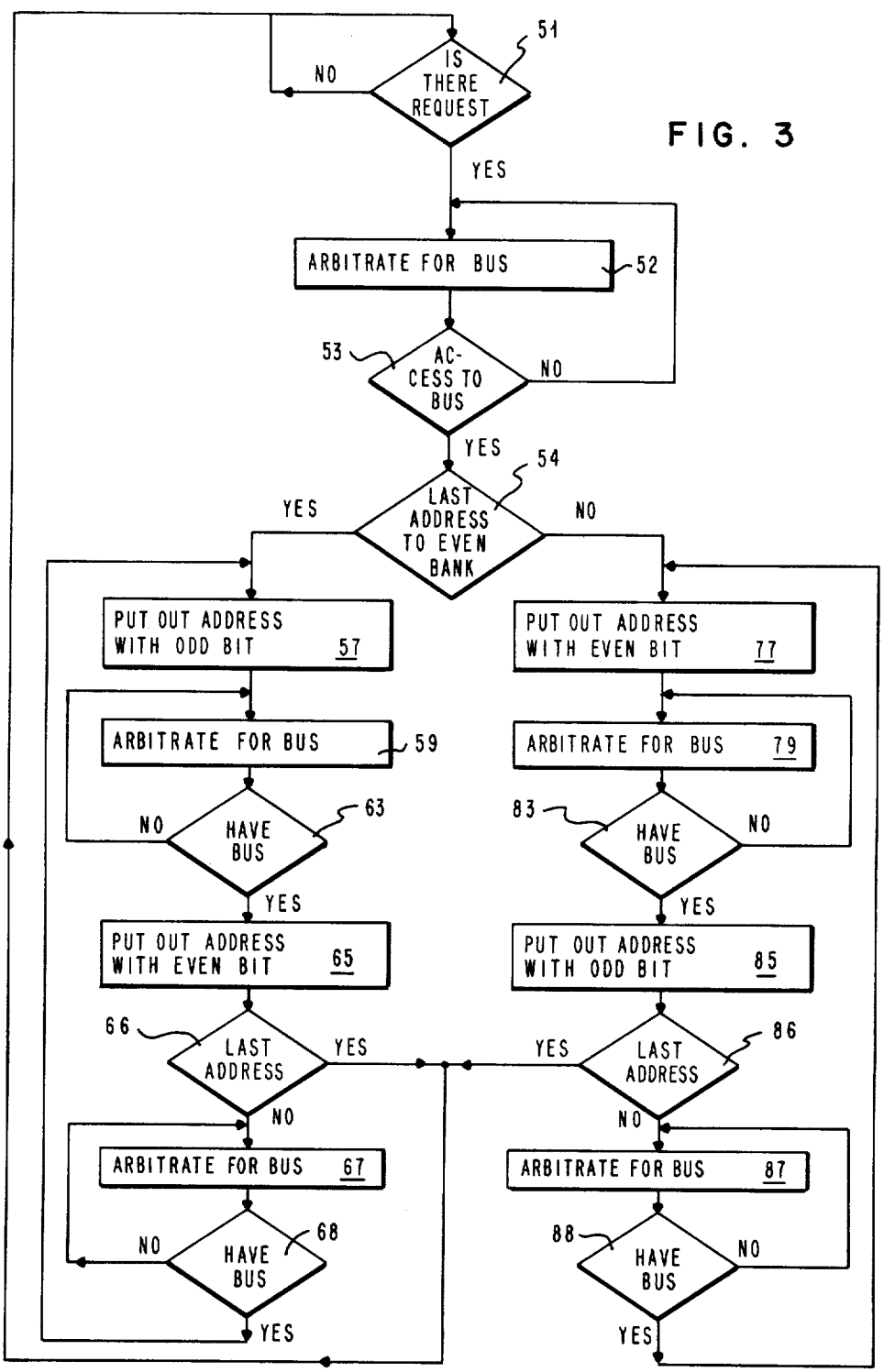
FIG. 3 is a flow chart of the general procedure involved in the practice of the present invention.

With reference to FIG. 3, when a request for an address transfer to storage comes up in CPU 11, it makes a determination, decision step 51, that it has a request to address storage. Then, step 52, the CPU indulges in arbitration for the bus. The arbitration scheme may be any conventional scheme wherein the three processors, i.e., CPU 11, and processors 16 and 17 (FIG. 1) contend for access and control of common bus 10. These are many and varied in the prior art described hereinabove. The present system utilizes a rather simple straight forward daisy chain approach wherein a predetermined priority is established which in the present case is that processor 17 has priority over processor 16 which in turn has priority over CPU 11. In the case where there is no request for the bus (step 51, FIG. 3), then an output pulse from controller 15 of processor 17 onto priority output line P1 which is up is put out. This in turn causes an output pulse on priority line P2 from controller 14 to also be up which in turn passes the priority to CPU 11 if CPU 11 has a request or access to bus 10. If CPU 11 does not, the system remains static in this normal state. If at some subsequent time, either processor 17 or 16 has such a request, then either controller 15 or controller 14 will eliminate the up pulse on either line P1 or P2 and the selected processor will take access to bus 10. If there is no request for access from either processor 16 or 17, then an up pulse will still remain on line P2 to CPU 11, which the present initial case, and the decision from step 51 (FIG. 3) is "No". If there is a request, the arbitration step 52 will give the bus to CPU 11 until such time as CPU 11 loses control of the bus to a higher priority processor. Whether a higher priority processor, i.e., processor 16 or 17, has control of the bus is determined in decision step 53. So long as another processor does not take control of bus 10, CPU 11 will retain control and will send out a series of alternate addresses to storage banks 1 and 2 (FIG. 1). This is illustrated in FIG. 4 by the sequence of the four time periods t0 to t3.

During the initial portion of each period, there is an arbitration which grants access to the bus to the CPU followed by a sequence of addresses alternating between bank 1 and bank 2. Thus, CPU address A1 is transferred to bank 1 during t0, address A2 to bank 2 during t1, address A3 to bank 1 during t2 and address A4 to bank 2 during t3. Now, at the initiation of time cycle t4, there is a switch in processors. A determination is made, decision step 53, that "Yes", processor 17 has access to bus 10. Next, the odd/even control logic 50 in controller 15 of processor 17 makes a determination as to whether the last address was to an even, i.e., bank number 2 (decision step 54, FIG. 3). This determination is made by looking at the status of the bit which has been latched in monitor latch M2 (FIG. 2) during the last cycle, t3. This is provided to control logic 50 over connector 55 (FIG. 2). Since the timing graph in FIG. 4 indicates that this last address A4 went to bank 2, then, there is a "Yes" branch from decision step 54 and, step 57, the control logic 15 will select from a standard queue of addresses ready for storage, an address in which the lowest significant bit is odd indicating that there will be a storage transfer to storage bank number 1.

Figure 4:
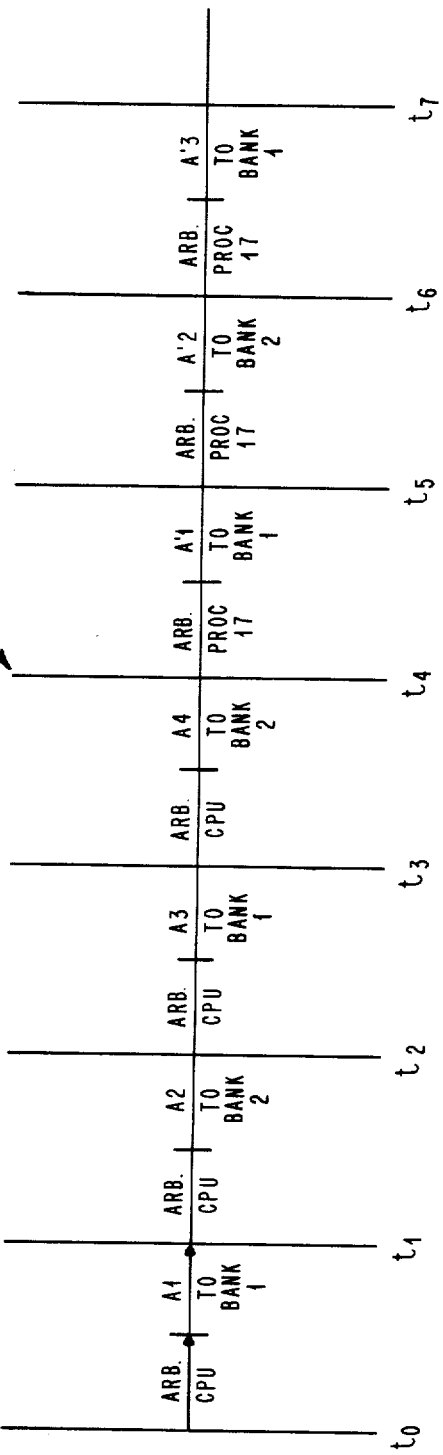
FIG. 4 is a timing graph illustrating the transferring of a sequence of addresses alternatively to interleaved storage banks 1 and 2 first during a CPU sequence and then after access to the common bus has switched to one of the processors.

Thus, in period t5 as indicated in FIG. 4, address A'1 in processor 17 will go to storage bank 1. This address is put out on the driver bus line 58 in the control logic 50 in FIG. 2 and applied to bus 10. Processor 17 is now ready to put out its next address A'2 alternatively to bank 2 (FIG. 4). In order to do so, it must again arbitrate for the bus, step 59 (FIG. 3). It does so by providing a signal from the odd/even control logic 50 on line 60 to OR-gate 61 and then the bus request line 62. If in decision step 63 a determination is made that processor 17 no longer has the bus, the operation is returned to step 59 wherein the processor 17 once again contends for the bus. After the determination is made, step 63, that the processor still has the bus, the operation proceeds to step 65, wherein an address with an even bit indicating a transfer to storage bank 2 is selected and transferred as previously described.

Next, step 66, a determination is made as to whether the previous address was the last address which processor 17 had to transfer to memory. If it is, then the system is returned to step 51. If there are still additional addresses to be transferred from processor 17, then, there is another arbitration for the bus, step 67. If by decision step 68, processor 17 still has access to the bus, the system is returned to step 57 and steps 57–66 are repetitively carried out to send alternating pairs of addresses sequentially to storage banks 1 and 2 until the point when processor 17 has no further addresses to send.

It should be noted that if in decision step 57 the last address from the CPU to the interleaved storage unit 12 had been to bank 1 instead of bank 2, then the "No" branch would have been taken and steps 77–88 would be carried out. Steps 77–88 are substantially equivalent to the steps 57–68, respectively, except that the initial address put out is an address with an even bit indicating a transfer to storage bank 2.

While the invention has been particularly shown and described with reference to a preferred embodiment it will be understood by those skilled in the art that various other changes in form and detail may be made without departing from the spirit and scope of the invention.

We claim:

1. A data processing system comprising:
   a first and a second storage unit responding to odd numbered and even numbered addresses respectively, each storage unit requiring more than a single information transfer interval to complete a storage transaction and said storage units including means for providing interleaved storage transactions;
   a common bus connected to said first and second storage units, said bus including arbitration means for regulating access to the bus and bus control means for providing pipelined operation of said bus;
   a plurality of processors connected to said common bus, and each including means for requesting access to the bus through the arbitration means and means for conducting transactions on said bus in accordance with said bus control means; and
   timing means for establishing a series of information transfer intervals;
   at least one of said processor having
      means for selectively commencing in response to bus access granted by the arbitration means, a storage transaction including an address transfer including a first address on said bus to one of said storage units during a transfer interval, the storage transaction initiated by said address transfer requiring more than one interval to complete,
      means for monitoring said bus in order to determine whether said first address on said bus has been transferred to said first or said second storage unit during said transfer interval, and
      said address transfer means further including means responsive to a determination that said first address has been transferred to said first or seond storage unit from said monitoring means for selectively transferring, in response to bus access granted by the arbitration means, the next subsequent address to the other of said storage units to establish interleaved storage transactions with said storage units.

2. The data processing system of claim 1 wherein said address transfer being monitored is from a processor other than the at least one processor having said monitoring means.

3. The data processing system of claim 2 wherein
   said at least one processor has means for commencing a sequence of alternating consecutive address transfers to said first and second storage units, and
   said alternating sequence means being responsive to the transfer of the first address monitored by said monitoring means for transferring the next address in the alternating consecutive sequence to establish the interleaved storage transactions.

4. The data processing system for claim 2 wherein
   said arbitration means includes priority means for providing one of said processors access to said bus during each of said transfer intervals according to a predetermined priority arrangement,
   said at least one processor having means for commencing a sequence of alternating consecutive address transfers to said first and second units over a series of intervals during which said processor has access to said bus, and
   said alternating sequence means being responsive to the transfer of the first address monitored by said monitoring means for transferring the next address is the alternating consecutive sequence to establish the interleaved storage transactions.

* * * * *

UNITED STATES PATENT AND TRADEMARK OFFICE
CERTIFICATE OF CORRECTION

PATENT NO. : 4,669,056
DATED : May 26, 1987
INVENTOR(S) : Donald E. Waldecker et al It is certified that error appears in the above—identified patent and that said Letters Patent is hereby corrected as shown below:

Column 8, line 5, "seond" should read --second--.

Column 8, line 38, "is" should read --in--.

Signed and Sealed this

Seventh Day of June, 1988

Attest:

DONALD J. QUIGG

*Attesting Officer*  *Commissioner of Patents and Trademarks*